3,357,963
PROCESS FOR PRODUCTION OF
POLYCYCLOHEXADIEN
Boris Vasiljevich Erofeev, Sofia Fadeevna Naumova, and
Inna Vladimirovna Kulevskaja, Minsk, U.S.S.R., assignors to Institute Fiziko-Organisheskoi Khimii, Minsk,
U.S.S.R.
No Drawing. Filed Sept. 1, 1964, Ser. No. 393,718
8 Claims. (Cl. 260—93.1)

The present invention relates to a process for the production of polycyclohexadien-1,3 by polymerization of cyclohexadien-1,3 in the presence of a catalyst representing a metallic compound.

A method is known for the production of polycyclohexadien-1,3 by polymerization of cyclohexadien-1,3 in the presence of $TiCl_4$ as a catalyst. According to this method, the process is effected at a subzero temperature (down to −40° C.) and at a high concentration of $TiCl_4$.

Another method is also known for the production of polycyclohexadien-1,3 by polymerization of cyclohexadien-1,3 in the presence of a complex catalyst $$(i\text{-}C_4H_9)_3Al + TiCl_4$$

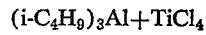

In this method, the process is run for 100 to 140 hours.

Both aforementioned methods have a common disadvantage; namely, the polymer obtained is contaminated with elements of the catalyst.

The cause of this disadvantage lies in the types of catalysts used. Utilization of $TiCl_4$ or its components as a catalyst results in the contamination of the polymer with chlorine, and this, in turn, complicates the process of the production of the polymer and requires special methods for its purification by reprecipitation and centrifuging.

The use of these methods, however, does not ensure complete purity of the polymer; thus, the content of chlorine in polycyclohexadien-1,3 obtained with $TiCl_4$ as a catalyst is 1 to 3 percent, the chlorine being in a chemically bound state and thereby affecting the properties of the polymer.

A further disadvantage of the first of the known methods is the necessity of running the process at a temperature considerably below zero, and hence the use of unduly high concentrations of the catalyst. This disadvantage is also associated with the type of the catalyst used which determines the conditions of the polymerization process.

A further disadvantage of the second method is the long duration of the process attributed to the catalyst action of the complex $(i\text{-}C_4H_9)_3Al + TiCl_4$.

An object of this invention is to obtain a polymer which is not contaminated with any catalyst elements.

Another object of the invention is to simply the process by eliminating the step of special purification by centrifuging.

A further object of the invention is to simplify the technology of the process by eliminating temperatures which are considerably below zero, and high concentrations of the catalyst.

A still further object of the invention is the reduction of the process time. The other objects of the invention include the possibility of setting up a continuous process.

In accordance with the above-mentioned and other objects of the invention, the latter is characterized by the following features which are described below. It is understood that alterations in the exact embodiment of the invention disclosed herein may be made within the scope claimed, without departure from the idea of the invention.

Further objects and advantages of the invention will become apparent from the following description:

The invention is aimed at providing a method for the production of polycyclohexadien-1,3 by polymerization of cyclohexadien-1,3 in the presence of a catalyst which does not contaminate the polymer obtained with impurities such as chlorine, and under conditions which exclude the possibility of such contamination and simplify the process.

It has been found that said technological problem may be solved in a satisfactory manner by using butyl lithium as a catalyst. This excludes the possibility of contamination of the polymer with catalyst elements such as chlorine. This also simplifies the process of polymer purification by eliminating the centrifuging stage.

It has further been found that the polymer production process may be run at 30° to 60° C. in a toluene or benzene solution. The homogeneous reaction mixture formed in this case makes it possible to run a satisfactory process at reduced concentrations of the catalyst.

In accordance with the above, it has been established that the polymer production process may be run successfully at a concentration of the catalyst used equal to 1 to 2 wt. percent of the initial cyclohexadien-1,3.

It has also been found that, due to the satisfactory catalytic activity of butyl lithium and at operating temperatures of 40 to 60° C. the polymer production process may be completed within a considerably shorter time, i.e. 5 hours.

*Example 1.*—Butyl lithium is obtained by one of the known methods. It should be obtained and stored in an atmosphere of pure nitrogen with no moisture or air oxygen being present.

100 ml. of dry n-hexane free of unsaturated compounds is poured into a three-neck 0.5 l. flask in a nitrogen stream. Then 0.78 g. of finely divided lithium is also placed in the flask. Thereupon 0.3 mole of n-butyl chloride ($C_4H_9Cl$) and another 100 ml. of n-hexane are gradually added from a dropping funnel with stirring. The mixture is heated for 2 to 3 hours; upon completion of the reaction, the resulting solution of butyl lithium is filtered off into a Scheenk flask and analyzed by a known procedure. The yield of butyl lithium is 70 to 80 percent of theory. The butyl lithium obtained is used in a solution of n-hexane at a concentration of 0.8 to 1.6 moles/l. 4.3 g. of toluene freshly distilled over metallic sodium and a solution of butyl lithium in n-hexane in the amount of 1.61 wt. percent of the cyclohexadien-1,3 used in the experiment are introduced in an inert gas atmosphere into a three-neck reaction flask provided with a mechanical agitator and a tube with a ground-glass joint for scavenging with an inert gas (nitrogen or argon) freed from moisture and oxygen. The reaction flask is maintained at 40° C; then 4.03 g. of cyclohexadien-1,3 (B.P. −80.5° C., $d_4^{20}$ −0.844, $n_D^{20}$ −1.4746) freshly distilled over metallic sodium is introduced with stirring in an inert gas atmosphere. The contents of the flask are held at 40° C. for 5 hours with continuous stirring. Thereafter, one to two volumes of toluene (5 to 10 ml.) is added to the reaction flask to precipitate the polymer, the reaction mixture is stirred and precipitated with methyl alcohol (3 to 4 times the volume of the reaction mixture). A white viscous substance precipitates, from which the liquid part is separated by decantation, the polymer itself being dried to a constant weight under a vacuum at 40 to 50° C. The polymer yield under said conditions is 99 wt. percent of the cyclohexadien-1,3 used in the experiment. The dried polymer is a snowwhite powder containing no ash (zero percent).

*Example 2.*—Butyl lithium was prepared as in Example 1. 105.4 g. of toluene freshly distilled over metallic sodium and 57 g. of cyclohexadiene-1,3 (B.P. —80.5° C., $d_4^{20}$ —0.844, $n_D^{20}$ 1.4746) freshly distilled over metallic sodium in an inert gas atmosphere are introduced in an inert gas atmosphere into a three-neck reaction flask provided with a mechanical agitator and a tube with a ground-glass joint for scavenging with an inert gas (nitrogen or argon) freed from moisture and oxygen. Then a solution of butyl lithium in n-hexane in the amount of 1.55 wt. percent of the cyclohexadien-1,3 used in the experiment is introduced with stirring in an inert gas atmosphere at room temperature. The reaction flask is maintained at 45° C., the temperature being gradually raised while the reaction mixture is stirred. The contents of the reaction flask are held at 45° C. for 5 hours with continuous stirring. Then 45 g. of a mixture consisting of 15 g. of toluene and 30 g. of alcohol is added to the reaction flask to precipitate the polymer.

The reaction mixture is stirred and precipitated with methyl alcohol in the amount of 250 g. A white viscous substance precipitates, from which the liquid is separated by decantation, the polymer being dried to constant weight under a vacuum at 40 to 50° C. The polymer yield under said conditions is 100 wt. percent of the initial cyclohexadien-1,3 used in the experiment.

The dried polymer is a snow-white powder containing no ash.

Table 1 exhibits the results of several experiments where the conditions of polymerization were identical with those described above, but differed in temperature, catalyst concentration and the amount of the monomer cyclohexadien-1,3 and solvent used in the reaction. The polymer with links of cyclic structure obtained under these conditions is a white amorphous powder with a density of 0.92; the iodine value of the polymer is 280, the softening point being 160 to 165° C. Ultimate analysis: C, 89.80; H, 10.20.

TABLE 1.—POLYMERIZATION OF CYCLOHEXADIEN-1,3

| Experiment No. | Time, hrs. | Temperature, ° C. | Weight of cyclohexadien-1,3, g. | Weight of toluene, g. | Weight of butyl lithium, g. | Wt. percent of lithium butyl as related to cyclohexadien-1,3 | Polymer yield |
|---|---|---|---|---|---|---|---|
| 1 | 5 | 40 | 4.02 | 4.30 | 0.065 | 1.61 | 99 |
| 2 | 5 | 40 | 3.81 | 4.30 | 0.073 | 1.92 | 98 |
| 3 | 5 | 60 | 4.00 | 4.30 | 0.044 | 1.10 | 99 |
| 4 | 5 | 60 | 4.08 | 4.30 | 0.044 | 1.09 | 99 |
| 5 | 5 | 60 | 14.98 | 34.40 | 0.190 | 1.26 | 97 |
| 6 | 5 | 45 | 14.75 | 29.99 | 0.1475 | 1.00 | 98.7 |
| 7 | 5 | 45 | 19.88 | 40.07 | 0.2186 | 1.10 | 100 |
| 8 | 5 | 40 | 46.67 | 52.20 | 0.7934 | 1.70 | 97.3 |
| 9 | 5 | 45 | 29.05 | 60.86 | 0.4357 | 1.50 | 97.2 |
| 10 | 5 | 45 | 29.96 | 59.95 | 0.3895 | 1.30 | 97 |
| 11 | 5 | 45 | 49.80 | 96.70 | 0.6673 | 1.34 | 97 |
| 12 | 5 | 45 | 31.30 | 64.40 | 0.4384 | 1.40 | 100 |
| 13 | 5 | 45 | 50.51 | 103.80 | 0.8586 | 1.70 | 100 |
| 14 | 5 | 45 | 57.00 | 105.40 | 0.8835 | 1.55 | 100 |
| 15 | 5 | 30 | 70.00 | 154.40 | 0.7040 | 1.00 | 98.5 |
| 16 | 5 | 30 | 88.6 | 91.90 | 1.289 | 1.45 | 99.0 |

What we claim is:
1. A process for the production of polycyclohexadien-1,3 comprising polymerizing cyclohexadien-1,3 at a temperature above room temperature in an organic solvent in the presence of butyl lithium.
2. A process as claimed in claim 1, wherein the butyl lithium is used in an amount of 1 to 2% by weight of the cyclohexadien-1,3.
3. A process as claimed in claim 1, wherein polymerizing is effected for about 4 hours.
4. A process for the production of polycyclohexadien-1,3 comprising polymerizing cyclohexadien-1,3, for about 5 hours in a toluene solution at 30 to 60° C. in the presence of 1 to 2 percent by weight of butyl lithium.
5. A process as claimed in claim 1 wherein the temperature is 30°–60° C.
6. A process as claimed in claim 1 wherein the organic solvent is benzene or toluene.
7. A process as claimed in claim 1 wherein polymerizing is effected in the presence of an inert gas.
8. A process as claimed in claim 7 wherein the inert gas is argon or nitrogen.

References Cited

FOREIGN PATENTS 223,817  5/1957  Australia.

OTHER REFERENCES

Chemical Abstracts 54: 10894g.

JOSEPH L. SCHOFER, *Primary Examiner.*

L. EDELMAN, *Assistant Examiner.*